United States Patent
Göpner (10) Patent No.: US 10,850,958 B2
(45) Date of Patent: Dec. 1, 2020

(54) METHOD FOR AUTOMATICALLY ALIGNING AN INDUSTRIAL TRUCK IN A WAREHOUSE, AND SYSTEM COMPRISING AN INDUSTRIAL TRUCK AND A WAREHOUSE

(71) Applicant: Jungheinrich Aktiengesellschaft, Hamburg (DE)

(72) Inventor: Oliver Göpner, Oering (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 134 days.

(21) Appl. No.: 15/833,187

(22) Filed: Dec. 6, 2017

(65) Prior Publication Data

US 2018/0155167 A1 Jun. 7, 2018

(30) Foreign Application Priority Data

Dec. 6, 2016 (DE) ........................ 10 2016 123 541

(51) Int. Cl.
*B66F 9/06* (2006.01)
*G05D 1/02* (2020.01)
*B66F 9/075* (2006.01)

(52) U.S. Cl.
CPC .......... *B66F 9/063* (2013.01); *B66F 9/07581* (2013.01); *G05D 1/028* (2013.01);
(Continued)

(58) Field of Classification Search
None
See application file for complete search history.

(56) References Cited

U.S. PATENT DOCUMENTS 5,938,710 A * 8/1999 Lanza .................... B66F 9/063
　　　　　　　　　　　　　　　　　　　　　180/169
8,731,777 B2 * 5/2014 Castaneda .......... B62D 15/0265
　　　　　　　　　　　　　　　　　　　　　701/41

(Continued)

FOREIGN PATENT DOCUMENTS

DE　　　0990802 A2　　4/2000
DE　　　10021822 A1　　11/2001

(Continued)

OTHER PUBLICATIONS

EP 17207698; filed Dec. 15, 2017; European Search Report dated Apr. 16, 2018; 3 pages.

(Continued)

*Primary Examiner* — Abby Y Lin
*Assistant Examiner* — Renee LaRose
(74) *Attorney, Agent, or Firm* — Barclay Damon LLP (57) ABSTRACT

A method for automatically aligning an industrial truck in a warehouse, the method comprising the steps of: confirming that a pick has been executed by an operator and issuing a pick signal indicative thereof; determining a pick position and a next pick position and issuing pick position signals indicative of each; determining a side orientation of the industrial truck relative to a shelf side of a shelf aisle of the warehouse by the warehouse administration system in response to at least one of the pick position signals; and issuing a control command signal to the industrial truck such that the side orientation is automatically assumed for at least one of the pick positions.

18 Claims, 3 Drawing Sheets

(52) U.S. Cl.
CPC ......... *G05D 1/0231* (2013.01); *G05D 1/0234* (2013.01); *G05D 1/0274* (2013.01); *G05D 1/0291* (2013.01); *B60L 2200/42* (2013.01); *B60L 2200/44* (2013.01); *B60L 2240/62* (2013.01); *B60L 2260/32* (2013.01); *G05D 2201/0216* (2013.01)

(56) References Cited

U.S. PATENT DOCUMENTS

| | | | |
|---|---|---|---|
| 9,317,037 B2* | 4/2016 | Byford | G05D 1/0231 |
| 10,259,694 B2* | 4/2019 | Smith | G07C 5/02 |
| 10,289,118 B2* | 5/2019 | Gopner | B66F 9/063 |
| 2004/0073359 A1* | 4/2004 | Ichijo | B66F 9/0755 701/50 |
| 2008/0189005 A1* | 8/2008 | Chilson | B60L 15/2036 701/28 |
| 2008/0262669 A1* | 10/2008 | Smid | G05D 1/0278 701/23 |
| 2011/0010023 A1* | 1/2011 | Kunzig | G01S 5/16 701/2 |
| 2011/0046813 A1* | 2/2011 | Castaneda | B66F 9/0755 701/2 |
| 2011/0166721 A1* | 7/2011 | Castaneda | B62D 15/0265 701/2 |

FOREIGN PATENT DOCUMENTS

| | | |
|---|---|---|
| DE | 10021823 A1 | 11/2001 |
| DE | 102007015488 A1 | 10/2008 |
| DE | 2123594 A1 | 11/2009 |
| DE | 2636637 A1 | 9/2013 |
| DE | 102014115152 A1 | 4/2016 |
| DE | 102016107451 A1 | 10/2016 |
| EP | 2500871 A1 | 9/2012 |
| EP | 2851331 A1 | 3/2015 |
| WO | 2011/002478 A2 | 1/2011 |

OTHER PUBLICATIONS

EP 20170204282; Filing Date Nov. 29, 2017; European Search Report dated Apr. 12, 2018 (6 pages).

* cited by examiner

METHOD FOR AUTOMATICALLY ALIGNING AN INDUSTRIAL TRUCK IN A WAREHOUSE, AND SYSTEM COMPRISING AN INDUSTRIAL TRUCK AND A WAREHOUSE

CROSS REFERENCE TO RELATED INVENTION

This application is based upon and claims priority to, under relevant sections of 35 U.S.C. § 119, German Patent Application No. 10 2016 123 541.5, filed Dec. 6, 2016, the entire contents of which are hereby incorporated by reference.

TECHNICAL FIELD

The invention relates to a method for automatically aligning an industrial truck, in particular an order picker, in a warehouse. Moreover, the invention relates to a system comprising an industrial truck, in particular an order picker, and a warehouse.

BACKGROUND

Today, side orientation of an order picker is performed manually within the shelf aisle. It is, for example, known for the operator to move the industrial truck to the corresponding shelf side using a control unit provided on the industrial truck, or a remote control. Semiautomated processes are also known in which the operator indicates by pressing a button whether the industrial truck should be oriented, for example, on the right or left of the shelf, and then the industrial truck independently moves to the corresponding shelf side. It is also possible for the industrial truck to be automatically oriented on the shelf side to which it was (manually) moved by the user. The described methods, therefore, always involve additional input by an operator to indicate a side orientation.

A method for controlling an industrial truck is known from EP 2 851 331 B1 in which the industrial truck has an optical sensor with a monitoring area, wherein the optical sensor is connected to a control device that determines the position of a person within a monitoring area provided for the optical sensor and makes the industrial truck follow the person. Monitoring limits are specified within the monitoring area, and a control device monitors when a person exceeds them. If it is ascertained that a monitoring limit has been exceeded, the drive of the industrial truck is controlled to move the vehicle forward until the person is again located on the original side of the monitoring limit. The person is thereby followed by the vehicle.

A method is known from EP 2 500 871 A1 for integrating an autonomous industrial truck in a plant administration system. The industrial truck has a navigation system and a plurality of additional sensors, the data of which can be wirelessly transmitted to the plant administration system. By means of the plant administration system, an operator can interact with the industrial truck and thereby control it remotely. If the industrial truck is incapacitated, for example due to a hindrance in its path, the event is reported to the plant administration system, and an operator can intervene in the driving behavior of the industrial truck.

BRIEF SUMMARY OF THE INVENTION

A method is provided for automatically aligning an industrial truck in a warehouse including the following steps.

In a first step, a first pick position is confirmed by an operator and a confirmation signal indicative thereof is issued to a warehouse administration system or a warehouse processor. The first pick position is then determined within the warehouse by the warehouse administration system.

Next, a side orientation of the industrial truck is determined by the warehouse administration system. The side orientation signal provides an indication concerning which side of the shelf aisle should the industrial truck be positioned for optimal access to the confirmed or first pick position. A next pick position of the industrial truck is then determined in the warehouse by the warehouse administration system. A control command is issued by the warehouse administration system to the industrial truck to augment control of the industrial truck such that the industrial truck is aligned within the aisle in a predetermined side orientation for the next pick position. The control command may drive or steer the industrial truck and is transmitted by the warehouse administration system to the industrial truck. In a final step, the next pick position is selected by the operator and a driving signal is provided to the industrial truck to move the industrial truck to the next pick position.

The system according to the invention comprising an industrial truck and warehouse comprises and input unit operably coupled to the industrial truck for receiving input commands by an operator. The input commands confirm various pick positions selected by the operator and move the industrial truck.

The system also includes a warehouse administration system configured to determine the instantaneous position of the industrial truck in a warehouse. The warehouse administration system also determines a side orientation of the industrial truck relative to a shelf side of a shelf aisle of the warehouse in connection with the pick position confirmed by the operator. The warehouse administration system also determines the next pick position in the warehouse in connection with a particular or current order, transmits a control command to the industrial truck to move to the next pick position.

The system also includes a control unit or signal processor operably coupled to the industrial truck designed to receive the control commands issued or transmitted by the warehouse administration system, and to control a drive and/or a steering system of the industrial truck. The control unit automatically aligns the industrial truck in a predetermined side orientation for the next pick position in the warehouse.

In another embodiment, a storage and retrieval system is provided having an industrial truck for executing a series of picks at a plurality of pick positions within an aisle of warehouse. The storage and retrieval system comprises a warehouse administration system configured to determine a position of the industrial truck within the aisle of the warehouse and to determine a side orientation of the industrial truck in connection with each of the pick positions. The storage and retrieval system further includes a control unit operably coupled to the industrial truck and responsive to the control command signals of the warehouse administration system. The control unit moves the industrial truck from one pick position to the next pick position such that the industrial truck automatically assumes the predetermined side orientation.

According to the invention, first the pick is confirmed by an operator. In the context of this application, "pick" is to be understood as a picking procedure, in particular taking a product from a bin of the warehouse and placing this product on a load part of the industrial truck. The pick comprises a predetermined amount of product, stipulated, for example, by an order on which the picking process is based. After the operator has executed the pick, the operator confirms the pick by, for example an input unit operably coupled to the industrial truck. The operator can also confirm to the industrial truck by a wireless transmission, e.g., a radio remote control confirming that the pick has been executed. The executed pick can be confirmed directly to the warehouse administration system by the radio remote control or wirelessly forwarded by the industrial truck to the warehouse administration system.

The warehouse administration system can assign a position in the warehouse to the confirmed pick, for example, by an order to be performed, by the type and/or the amount of product. If the warehouse administration system knows the pick position, the position of the industrial truck in the warehouse can also be known since it is typically located directly next to the pick position. In addition to the position of the industrial truck, the warehouse administration system also determines the side orientation of the industrial truck relative to a shelf aisle in the warehouse. The warehouse can have a plurality of shelves forming shelf aisles between the shelves. Each shelf aisle has two shelf sides. In the context used herein, "side orientation" means a side position of the industrial truck, either at a certain angle, and/or at a certain distance, to the respective shelf, and/or to the respective pick position. Depending on the direction in which the industrial truck is driven in the shelf aisle, the current or next pick position can, for example, be positioned to the left or right. The warehouse administration system can, therefore, determine the side orientation of the industrial truck in particular with reference to a previous pick position, which yields the driving direction of the industrial truck. A specified side orientation of the industrial truck can however be assigned to any pick position, for example because the respective picking place is always approached from the same side. It can also be provided that the operator simultaneously communicates information about the side orientation of the industrial truck to the industrial truck, or respectively to the warehouse administration system when confirming the pick.

The warehouse administration system ascertains or determines the next picking position in the warehouse. This is, for example, the next picking position to be approached by the operator in carrying out an order comprising several picking positions. In particular, the entire order can be known to the warehouse administration system. Depending on the next picking position, the warehouse administration system transmits to the industrial truck a control command for driving and/or for steering the industrial truck to the next pick position. A control unit of the industrial truck receives the control command and initiates the driving, or respectively steering of the industrial truck corresponding to the command. By means of this control command, the industrial truck is aligned in a predetermined side orientation for the next picking position. The vehicle moves into a specific side position relative to the next picking position. The warehouse administration system knows what side orientation the industrial truck needs to assume for the next picking position. As noted above, a specific side orientation of the vehicle can, for example, be assigned to each picking position. Moreover, a corresponding side orientation for each picking position can result from a sequence of the picking positions established by an order, or reported by the operator. In response to the control commands of the warehouse administration system, the industrial truck automatically aligns itself for the next picking position so that an operator can easily exploit or access this picking position for the picking process.

This alignment of the industrial truck to the predetermined side orientation can be with respect to the shelf aisle, in particular relative to a shelf side of the shelf aisle. If the industrial truck is, for example, located on a left shelf side in the driving direction in order to use a first operating position, and if the next picking position to be approached by the industrial truck is for example on a right shelf side, the industrial truck may be prompted to automatically switch to the right shelf side following confirmation of the previous pick on the left shelf side. In this case, in particular the drive and steering system of the industrial truck are controlled. If the next picking position is located on the same shelf side, the drive but not the steering system of the industrial truck can for example be controlled. Then the next picking position is approached by the operator. For example, the operator can initiate the approach to the next picking position on the part of the industrial truck by means of radio remote control.

According to the invention, an industrial truck is automatically aligned with reference to the side of the next picking position in a warehouse. The operator no longer manually aligns the industrial truck relative to the next picking position, and also does not have to provide any instructions for the automatic alignment. Instead, the industrial truck is fully and automatically aligned by the warehouse administration system. On the one hand, this renders picking more efficient. On the other hand, by the automatic alignment of the industrial truck, the operator is automatically informed of the shelf side where the next picking position is located. The precise approach to the picking position remains the responsibility of the operator so that the operator in combination with industrial truck can accurately and smoothly execute the next pick in the sequence of picking positions.

According to a preferred embodiment, the industrial truck is aligned in the predetermined side orientation relative to a shelf aisle as explained above in that the industrial truck is positioned at a specific distance to a side of the shelf aisle. The industrial truck can approach the corresponding shelf side close enough for the operator to very easily and efficiently transport products from the shelf to a load part of the industrial truck. The distance between industrial truck and shelf side can be selected so that an operator only has to turn around when picking and does not have to make any additional steps. The control unit receives the control command signals transmitted by the warehouse administration system to control the drive and steering system of the industrial truck so that the industrial truck is positioned at a specific or predetermined distance to a shelf side. The industrial truck can, in particular, be positioned parallel to a shelf side. For example, a central longitudinal axis of the industrial truck extending along the driving direction can be aligned parallel to the respective shelf side in this parallel position.

According to another embodiment, the industrial truck is aligned in the driving direction of the industrial truck on the left in the shelf aisle when the next picking position is located on the left side in the driving direction. Furthermore, the alignment of the industrial truck is on the right in the shelf aisle when the next picking position is located on the right side of the shelf in the driving direction. As already noted, the industrial truck can in particular be oriented on a left and/or right shelf side. The industrial truck can in particular be designed so that it only can be moved in the driving direction, but not however in reverse or opposite thereto. Another embodiment comprises aligning the industrial truck in the middle of the shelf aisle when the next picking position lies in an adjacent shelf aisle, or a final picking position has been reached. The industrial truck can be essentially the same distance from both shelf sides of the shelf aisle. It accordingly does not have any side orientation to a specific shelf side. Given such an alignment of the industrial truck, the operator can be notified that, to reach the next picking position, he has to enter the next shelf aisle either together with the industrial truck, or that a final picking position has been reached and an order that may have to be performed is finished.

According to another embodiment, the pick confirmed by the operator and/or the driving signal given by the operator is transmitted wirelessly by a radio remote control to the industrial truck. As already mentioned above, a radio remote control can be provided, by means of which the operator can wirelessly transmit the execution of the pick to the industrial truck. Moreover, the operator can move the industrial truck by the radio remote control in that the operator wirelessly transmits a driving signal via the radio remote control to the industrial truck. The driving signal can in particular be transmitted to the control unit, or to a transmitting and receiving unit of the industrial truck connected to the control unit. Corresponding to the driving signal, the drive and/or steering system of the industrial truck is controlled. Preferably however, only the drive is controlled to move the industrial truck forward by the driving signal. Since the industrial truck has already been oriented by being automatically aligned on the side of the next picking place, only forward movement is needed without additional steering.

According to another embodiment, the remote controllability of the industrial truck is switched off by the warehouse administration system after confirmation of the last pick in the shelf aisle. It can also be provided that, after the last pick is finished and confirmed by the operator, there is no further automatic alignment of the industrial truck relative to the next picking position when the picking position is located in the next shelf aisle. "Remote controllability" in this context means the automatic alignment of the industrial truck in the predetermined side orientation for the next picking position. In particular, it can be provided that after the last pick in the shelf aisle has been confirmed, the warehouse administration system first positions the industrial truck by a control command in the middle of the shelf aisle as explained above. Then the remote controllability can be switched off. The operator then travels with the industrial truck into the next shelf aisle by manually entering a command, and manually controls the next picking place at that location. The side orientation of the industrial truck can also be performed manually in this case, i.e., for a first picking place in the shelf aisle. After the first pick in the first shelf aisle is confirmed, the remote controllability of the industrial truck can be reactivated; automatic alignment according to the invention can be carried out for the subsequent picking places in the same shelf aisle.

The system according to the invention is suitable for carrying out the method according to the invention. The method according to the invention can be carried out by the system according to the invention.

BRIEF DESCRIPTION OF THE DRAWINGS

The invention will be explained below with reference to figures. If not otherwise specified, the same reference numbers indicate the same objects. In the following.

DETAILED DESCRIPTION OF THE INVENTION

Figure 1:
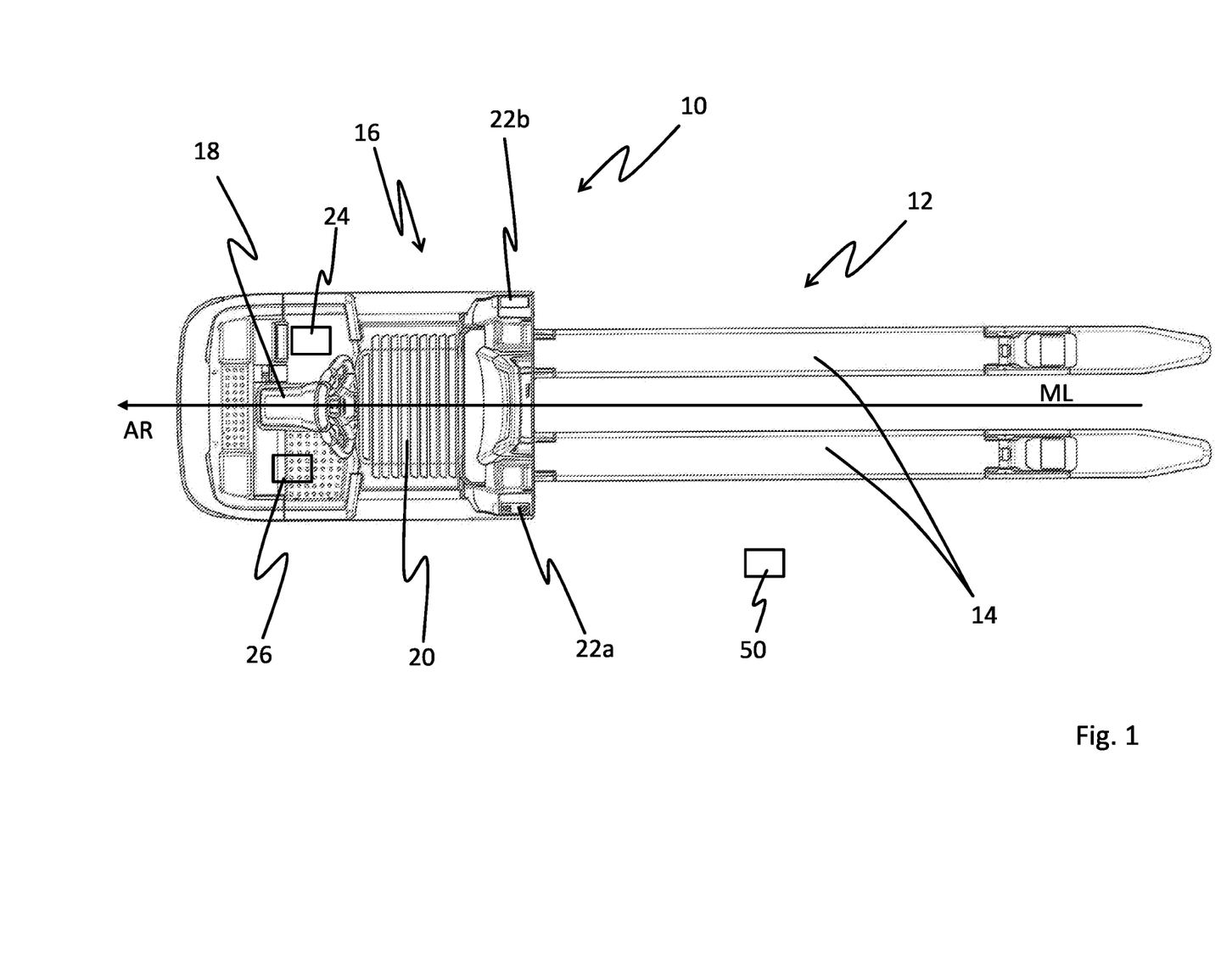
FIG. 1 shows an order picker in a schematic plan view.

FIG. 1 shows an industrial truck 10 comprising a load part 12 with two forks 14 that are designed to receive pallets for picking products. Moreover, the industrial truck 10 comprises a drive part 16 with a short drawbar 18 and a standing platform 20. An operator located on the standing platform 20 can guide the industrial truck 10 by the short drawbar 18. However, a radio remote control 50 can also be used to guide the industrial truck 10. The radio remote control 50 is wirelessly in contact with a control unit 24 of the industrial truck 10. Moreover, the industrial truck 10 has two input units 22a, 22b. An arrow identified with AR designates the driving direction of the industrial truck. In addition, a driving and steering drive 26 is schematically portrayed.

Figure 2:
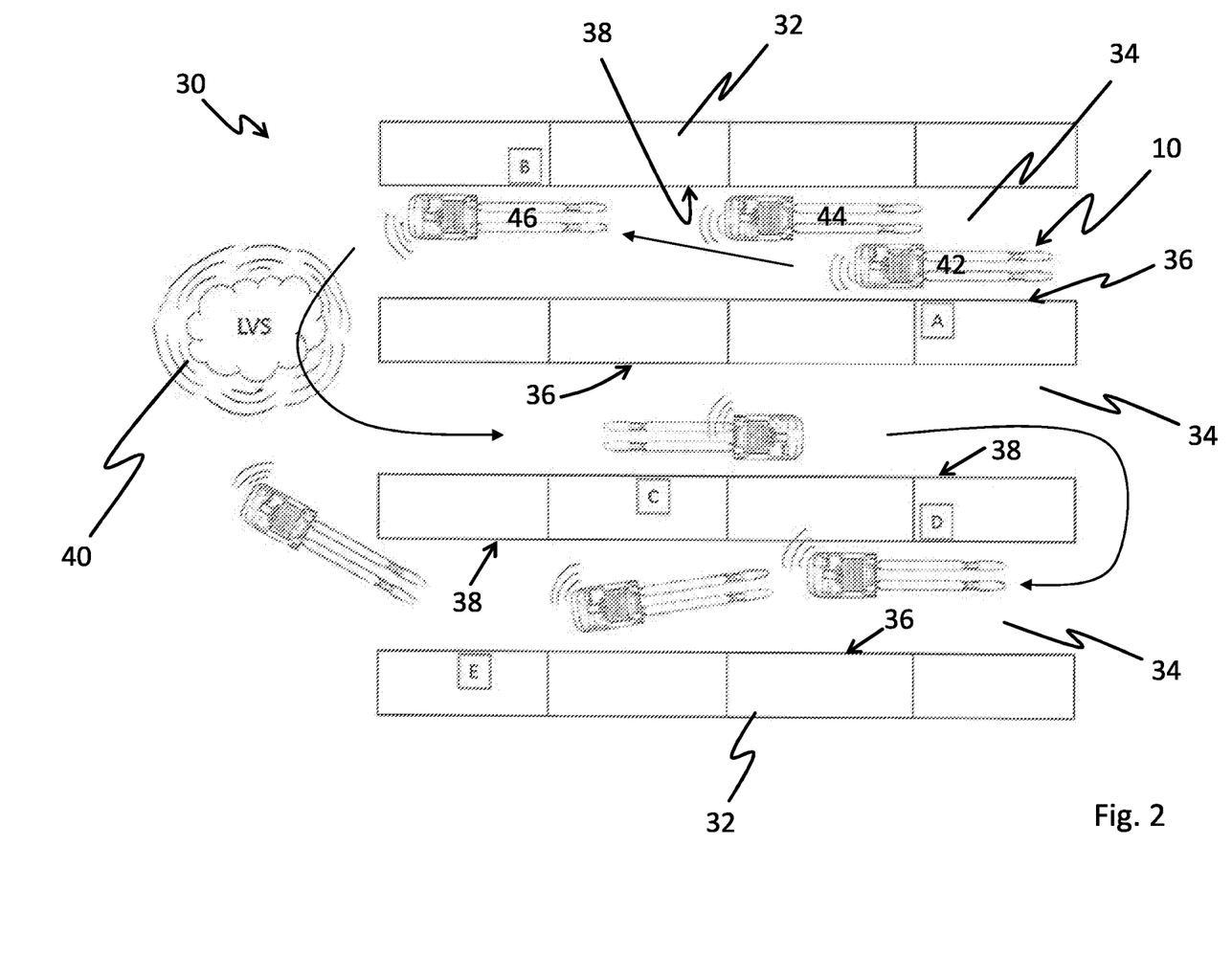
FIG. 2 shows a warehouse with a plurality of shelf aisles and an industrial truck driving through the shelf aisles in a plan view.

FIG. 2 shows a plurality of positions of the industrial truck 10 in a warehouse 30. The warehouse 30 comprises four shelves 32 and shelf aisles 34 lying between the shelves 32. The shelves 32 each consist of four shelf segments. The shelf aisles 34 also have two shelf sides 36, 38, wherein the shelf sides located on the left side of the industrial truck with reference to the driving direction AR of the industrial truck 10 are identified with reference sign 36, and the opposite right shelf sides are identified with reference sign 38. Different picking positions within the shelves 32 are identified with letters A to E. Moreover, the warehouse administration system 40 is schematically portrayed as a cloud LVS.

To start an order, an operator moves the industrial truck 10 into picking position A on the left shelf side 36 in the top shelf aisle 34 in FIG. 2. For this, the operator can use the short drawbar 18 standing on the standing platform 20, or remotely control the industrial truck 10 by the radio remote control 50. At picking position A, the operator executes a picking process, i.e., moves products from picking position A from the shelf 32 to the load part 12 of the industrial truck 10. The industrial truck 10 is oriented on the left shelf side 36, i.e., aligned parallel to this shelf side at a predetermined distance. After executing the picking procedure, the operator confirms the execution of the pick by the left control element 22a of the industrial truck 10.

The industrial truck 10 then transmits this confirmation to the warehouse administration system 40. The warehouse administration system 40 is aware of all of the picking positions A to E so that it can assign a precise position within the warehouse 30 to the industrial truck 10. In addition, the warehouse administration system 40 determines the side orientation of the industrial truck 10 relative to the shelf side 36 at which the picking position A is located. This can occur in several ways as follows. For example, a specific side orientation of the industrial truck can be assigned to each picking position, or the warehouse administration system can ascertain the side orientation of the industrial truck from the driving direction of the industrial truck. In addition, the warehouse administration system can identify the side orientation of the industrial truck from entries by the operator. In the present exemplary embodiment, the warehouse administration system 40 is notified that the industrial truck 10 is oriented on the left shelf 36 since the operator confirms the executed pick with the left control unit 22a.

With an order saved in the warehouse administration system 40, the warehouse administration system 40 then ascertains the next picking position B to be approached by the operator. The warehouse administration system 40 then transmits a control command for the drive, or respectively the steering system 26, to the control unit 24 of the industrial truck 10. Based on this control command, the industrial truck 10 aligns in a predetermined side orientation for the next picking position B in the shelf aisle 34 so that it approaches the right shelf side 38 belonging to picking position B. The industrial truck 10 then automatically travels from position 42 to position 44 and accordingly orients on the right shelf side 38. The industrial truck aligns on the right shelf aisle since the next picking position B is located on the right shelf side 38 in the driving direction AR. The alignment in the predetermined side orientation for the next picking position B specifically consists of the parallel alignment of a middle longitudinal axis ML (see FIG. 1) of the industrial truck 10 relative to the right shelf side 38 at a predetermined distance. To reach position 44 from position 42, both the drive and steering system of the industrial truck are controlled. The operator accordingly no longer has to independently align the industrial truck with the right shelf side 38. Moreover, the operator is notified that the next picking position B is located at the right shelf side 38 opposite picking position A.

The next picking position B is controlled by the operator in that the operator initiates a corresponding driving signal. For this, the operator can for example step onto the standing platform 20 and use the control 18 to move to picking place B. Likewise, the operator can initiate the driving signal by radio remote control 50. Then the operator can carry out a picking process at picking position B. After this picking process as well is concluded, the operator can confirm the picking using the control unit 22b on the industrial truck. The industrial truck can then align in the explained manner to use the next picking place C. After the picking process is completed at the picking position and has been acknowledged by the operator, the industrial truck 10 can be aligned in the middle of the top shelf aisle 34 after communicating with the warehouse administration system 40, and can notify the operator that the next picking position C is located in the following shelf aisle 34. The operator can then in particular manually drive the industrial truck 10 into the next shelf aisle along the depicted arrow line. The operator can then first manually approach picking place C and align the industrial truck on the right shelf side 38.

After confirming the pick at position C, the industrial truck can then again be positioned in the middle of the middle shelf aisle 34 in order to indicate to the operator that the next picking position D is in the bottom shelf aisle 34. The operator can then travel with the industrial truck 10 to picking position D along the depicted arrow line. After the pick D is confirmed, the industrial truck 10 automatically aligns with the opposite left shelf side 36 for picking position E and can be moved by the operator from there to picking place E. After the last pick is confirmed at picking place E, the industrial truck can again align in the middle of the shelf aisle 34 and accordingly notify the operator that the last picking process is finished, and the order has been carried out.

Figure 3:
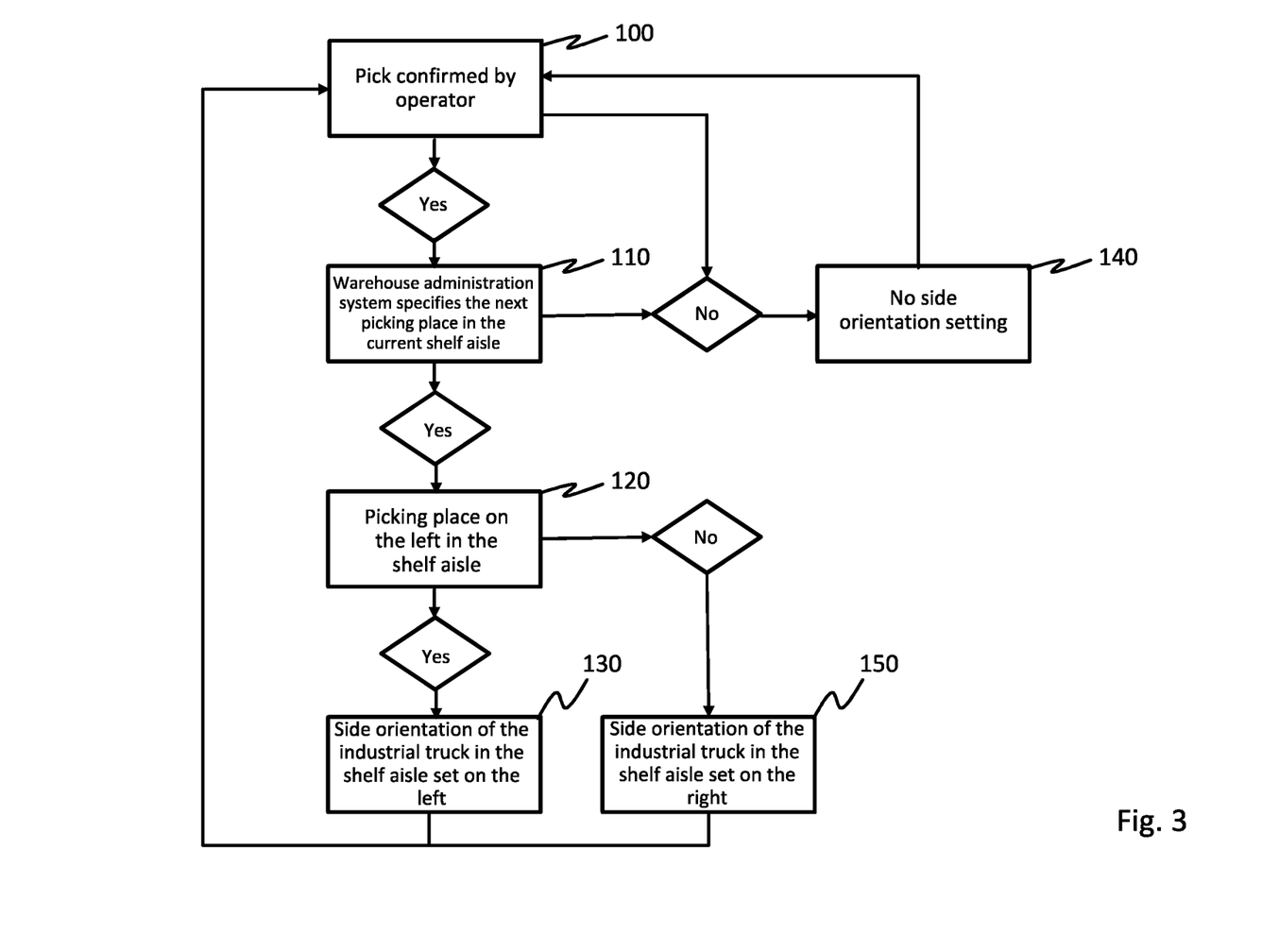
FIG. 3 shows a diagram of an embodiment of the method for automatically aligning an industrial truck in a warehouse.

FIG. 3 schematically portrays the steps of the method. The method begins with the confirmation of a pick by an operator ("Pick confirmed by operator", step 100). If such a pick confirmation is recorded, the warehouse administration system specifies the next picking place in the current shelf aisle ("Warehouse administration system specifies the next picking place in the current shelf aisle", step 110). As mentioned, the warehouse administration system deduces the position and side orientation of the industrial truck from the confirmed picking position. If the next picking place is in the current shelf aisle, the warehouse administration system first ascertains whether the picking place is on the left in the shelf aisle ("Picking place on the left in the shelf aisle", step 120). If the next picking place is on the left in the shelf aisle, the side orientation of the industrial truck is also set as the left ("Side orientation of the industrial truck in the shelf aisle set on the left", step 130). Then the industrial truck is aligned on the left shelf side in this case as well. Then the method can start from the beginning. If the operator does not confirm a pick or if the next picking place is not in the current shelf aisle, a side orientation is not set ("No side orientation setting", step 140). The method then again starts from the beginning. Alternatively, the industrial truck can be positioned in the middle of the shelf aisle provided at the last picking position once the shelf aisle has been reached. If the next picking place is not on the left in the current shelf aisle, the side orientation of the industrial truck is also set as the right ("Side orientation of the industrial truck in the shelf aisle set on the right", step 150). The method also restarts after this as well. It is of course alternatively conceivable to check in step 120 if the picking place is on the right in the shelf aisle, which would cause the subsequent steps 130 and 150 to switch.

The invention claimed is:

1. A method for automatically aligning an industrial truck in a warehouse, the method comprising the step of:
   confirming that a pick has been executed by an operator and sending a pick signal indicative thereof;
   receiving the pick signal by a warehouse administration system;
   determining a position of the industrial truck in the warehouse by the warehouse administration system using the pick signal;
   determining a next pick position of the industrial truck by the warehouse administration system and issuing a next pick position signal indicative of the next pick position;
   determining a side orientation of the industrial truck relative to a shelf side of a shelf aisle of the warehouse by the warehouse administration system for the next pick position; and
   issuing a control command signal to the industrial truck indicative of the next pick position and of the side orientation for the next pick and controlling the industrial truck such that the side orientation is automatically assumed for the next pick position.

2. The method of claim 1, wherein the step of issuing the control command signal to the industrial truck further comprises the step of:
   orienting the industrial truck to optimize the distance between the industrial truck and the shelf aisle.

3. The method of claim 1, wherein the step of issuing the control command signal to the industrial truck further comprises the step of:
   orienting the industrial truck to optimize an angle between the industrial truck and the shelf aisle.

4. The method according to claim 1, wherein the step of issuing the control command signal to the industrial truck further comprises the step of:
   aligning the industrial truck in a driving direction on a left side of a shelf aisle when the next pick position is located on a shelf side on the left in the driving direction; and aligning the industrial truck in the driving direction on a right side of the shelf aisle when the next pick position is located on the shelf side on the right in the driving direction.

5. The method according to claim 1 wherein the step of issuing a control command signal to the industrial truck further comprises the step of:

aligning the industrial truck substantially midway between the shelves of one aisle when the next pick position is in an adjacent aisle.

6. The method according to claim 1 wherein the step of confirming the pick position includes the step of transmitting a pick confirmation signal wirelessly.

7. The method according to claim 1 wherein the step of issuing command signals includes the step of transmitting the command signals wirelessly.

8. A storage and retrieval system for optimizing movement of an industrial truck within a warehouse, comprising:

an input unit disposed on an industrial truck and configured to receive operating commands to confirm a pick provided by an operator;

a control unit configured to issue a pick signal corresponding to the pick provided by the operator;

a warehouse administration system configured to:
receive the pick signal of the control unit,
determine a position of the industrial truck using the pick signal received form the control unit,
determine a side orientation of the industrial truck relative to a shelf side of a shelf aisle in the warehouse for the next pick, and to issue control command signals to the industrial truck indicative of the side orientation of the industrial truck for the next pick; and a signal processor configured to receive the control command signals such that the side orientation is automatically assumed for the next pick position.

9. The system according to claim 8, wherein the signal processor is configured to align the industrial truck in a predetermined side orientation such that the industrial truck is positioned at a specific distance to a side of the shelf aisle.

10. The system according to claim 8, wherein the signal processor aligns the industrial truck in a driving direction on a right of the shelf aisle when the next pick position is located on a shelf side on the right in the driving direction.

11. The system according to claim 8, wherein the signal processor aligns the industrial truck substantially midway between the shelves of one aisle when the next pick position is in an adjacent aisle.

12. The system according to claim 8, further comprising a radio remote control for confirming a pick.

13. A storage and retrieval system having an industrial truck for executing a series of picks at a plurality of pick positions within an aisle formed by at least two shelves within a warehouse, the storage and retrieval system further comprising:

a warehouse administration system configured to,
determine a position of the industrial truck within a shelf aisle of the warehouse,
determine a side orientation of the industrial truck in connection with each of the plurality of pick positions, and
issue control command signals indicative of the side orientation; and a control unit operably coupled to the industrial truck and responsive to the control command signals to automatically move the industrial truck from one pick position to the next pick position such that the industrial truck automatically assumes the side orientation corresponding to the next pick position.

14. The system according to claim 13, wherein the control unit is responsive to the control command signals such that the industrial truck is positioned at a specific distance to a side of the shelf aisle.

15. The system according to claim 13, wherein the control unit is responsive to the control command signals such that the industrial truck is positioned at a designated angle relative to a side of the shelf aisle.

16. The system according to claim 13, further comprising an input unit operably connected to the industrial truck for receiving inputs from an operator to execute one of the picks.

17. The system according to claim 13, wherein the control unit is responsive to the control command signals such that the industrial truck is aligned in the middle of a shelf aisle when the next picking position is in an adjacent shelf aisle.

18. The system according to claim 13, wherein the control command signals are transmitted wirelessly.

* * * * *

UNITED STATES PATENT AND TRADEMARK OFFICE
CERTIFICATE OF CORRECTION

PATENT NO. : 10,850,958 B2  
APPLICATION NO. : 15/833187  
DATED : December 1, 2020  
INVENTOR(S) : Oliver Göpner Page 1 of 1

It is certified that error appears in the above-identified patent and that said Letters Patent is hereby corrected as shown below:

In the Claims

Claim 8:  
Column 9  
Line 27 change "form" to --from--

Claim 10:  
Column 9  
Line 43 change "right of" to --right side of--

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*